United States Patent [19]
Krulls

[11] 3,805,217
[45] Apr. 16, 1974

[54] CONNECTION BAR COUPLING

[75] Inventor: Gerd E. Krulls, Delanson, N.Y.

[73] Assignee: General Electric Company, New York, N.Y.

[22] Filed: Jan. 2, 1973

[21] Appl. No.: 320,492

[52] U.S. Cl. .......... 339/92 R, 339/94 R, 339/177 R
[51] Int. Cl. ............................................ H01r 13/54
[58] Field of Search ......... 339/89, 92, 94, 136, 137, 339/177

[56] References Cited
UNITED STATES PATENTS
2,757,351   7/1956   Klostermann .................. 339/177 R
2,783,295   2/1957   Ewing ............................... 339/94 R

*Primary Examiner*—Joseph H. McGlynn
*Attorney, Agent, or Firm*—John F. Ahern; James W. Mitchell

[57] ABSTRACT

A coupling for a pair of hollow shafts each of which includes at least one conductor bar to also be correspondingly connected one to the other. The shaft members and the conductor bars respectively include coupling flanges wherein Belleville springs are utilized to effect electrical connection of the flanges on the conductor bars.

5 Claims, 4 Drawing Figures

CONNECTION BAR COUPLING

BACKGROUND OF THE INVENTION

The present invention relates generally to apparatus for coupling electrical conductors disposed within the bores of adjacent hollow shaft members. More specifically, the invention is directed to a new and improved coupling for such conductors which are disposed in separate shaft members.

As is well known in certain types of dynamoelectric machines, such as generators, excitation current is carried to rotor windings along conductors disposed centrally in the bore of the rotor shaft. These conductors electrically connect the rotor field windings with collector rings which in turn are electrically connected to an exciter. Collector rings are generally mounted on the rotor shaft itself. However, in some instances, it is desirable to mount the collector rings on a stub shaft, separate from the generator rotor shaft. In such a structure, it is necessary to mechanically connect the stub shaft to the rotor shaft and likewise to electrically connect the conductors within the two shafts. This is one application in which the new and improved coupling of the present invention may be used.

One of the basic problems involved in the electromechanical connection for hollow shaft members and electrical conductors disposed therein as carried out by the prior art is the necessary provision for access ports to permit internal coupling of the conductor elements in addition to mechanical coupling of the hollow shaft members. An additional problem has been encountered in a generator assembly hereinabove contemplated. Some such generators are charged with hydrogen gas for cooling purposes. When the access ports referred to above for internally coupling the electrical conductors are not properly plugged during assembly, the hydrogen gas leaks from the hollow shaft members and out of the access ports.

The prior art discloses designs for coupling hollow shaft members and internally disposed electrical conductors, but in so doing the prior art has not overcome the problem solved by the present invention. Generally speaking, the prior art structures include mating flanges on the conductor elements as well as on the hollow shaft members whereby both sets of corresponding flanges are bolted together. In order to secure the conductor flanges together, however, access holes have been provided in the shaft members for engaging bolts or other coupling means into the conductor flanges.

The present invention effectively overcomes the above problems of the prior art. The invention is directed to a new and improved structure in which the conductor flanges are secured together in electrical connection. In lieu of bolts which have been used to secure the conductor flanges together in the prior art, the present invention utilizes one or more Belleville springs located between the coupling flange of each shaft member and the conductor flange disposed therein. When the coupling flanges of the respective shaft members are joined together, the Belleville springs axially urge the conductor flanges toward each other and into electrical connection. In one embodiment, it is proposed to mount the plurality of Belleville springs between two pressure plates which could then be assembled as an integral unit into a corresponding mounting cavity in the coupling flange of each shaft member thereby providing for a simplified assembly procedure. When the coupling flanges of the shaft members are mechanically secured together, the Belleville springs necessarily react through the pressure plates against their respective shafts to urge the respective conductor flanges into electrical connection. Thus, with the conductor flanges "spring loaded" the necessity for the separate bolting together of the conductor flanges as shown in the prior art has been eliminated. The new and improved structure provided by the invention does not require access holes in the coupling flanges of the shafts to the cavity in which the Belleville springs are mounted and therefore the possibility of hydrogen leakage taking place at this location due to a faulty access hole plug is overcome.

Accordingly, it is an object of the present invention to provide a simplified assembly for coupling adjacent electrical conductors disposed within a pair of coupled hollow shafts.

Another object of the present invention is to provide an electromechanical coupling which obviates the necessity for access holes through the hollow shaft members previously required to effect the coupling of the internally disposed conductor elements.

A still further object of the present invention is to provide a new and improved electromechanical coupling for use in a dynamoelectric machine internally charged with a cooling gas wherein the possibility of cooling gas leakage existing in prior art structures is precluded.

SUMMARY OF THE INVENTION

Briefly, the present invention provides an electromechanical coupling having a pair of adjacent hollow shaft members, each shaft member having a coupling flange proximate its end to be coupled to a mating coupling flange. In one embodiment of the invention, a conductor bar is disposed within each hollow shaft and insulated therefrom. At one adjacent end of the conductor bars to be connected to one another, radially extending conductor flange is disposed in the respective coupling flange of the shaft members and insulated therefrom. One or more Belleville springs are mounted intermediate the coupling flanges and the respective conductor flanges. When the coupling flanges are bolted together, the Belleville spring or springs react against the respective coupling flanges and necessarily force the conductor flanges into electrical connection one with the other.

DESCRIPTION OF THE DRAWINGS

The subject matter which is regarded as the invention is particularly pointed out and distinctly claimed in the claims set forth at the end of the specification. The invention, however, both as to organization and method of practice, may be best understood by reference to the following description taken in conjunction with the accompanying drawings, in which:

DESCRIPTION OF ONE OF THE PREFERRED EMBODIMENTS

Figure 1:
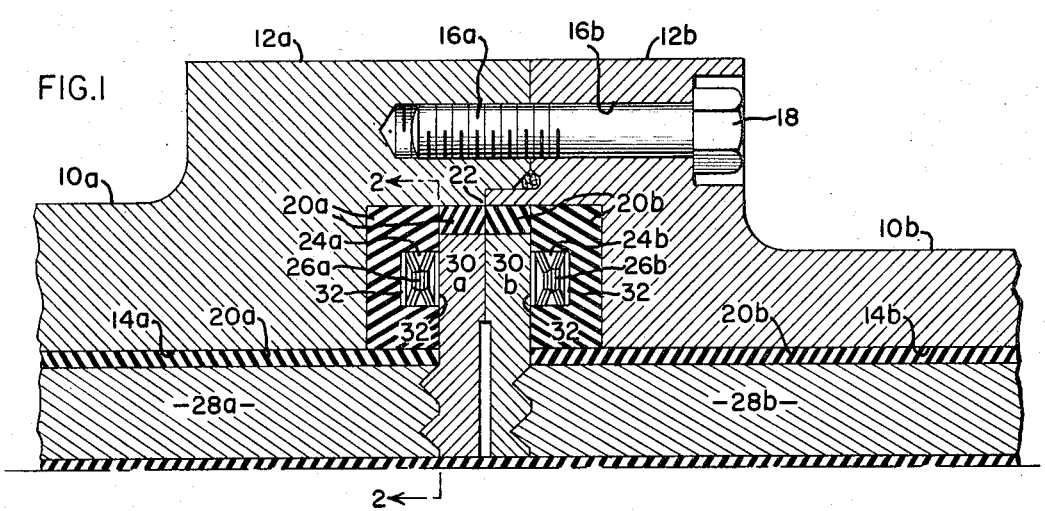
FIG. 1 is a side view of the coupling utilizing a plurality of Belleville springs between each pair of adjacent coupling and conductor flanges.

Referring to FIG. 1 of the drawings, a pair of hollow shaft members 10a and 10b each include a coupling flange 12a and 12b respectively. In the embodiment considered herein, the shaft member 10a is a portion of the rotor of a generator and the other hollow shaft is a portion of the stub shaft connected to the rotor. The hollow shafts 10a and 10b further define respective axial bores 14a and 14b. Coupling flange 12b includes a plurality of apertures 16b about its peripheral circumference for receiving threaded members such as bolts 18 therethrough. The complementary coupling flange 12a includes a plurality of threaded portions 16a which are spaced about the peripheral circumference thereof so as to be aligned with the apertures 16b. The threaded portions 16a receive the bolts 18 and retain the two complementary coupling flanges in engagement with one another.

Each of the hollow shafts include electrical insulating elements respectively indicated as 20a and 20b. Each insulating element concentrically lines the axial bore of its respective hollow shaft. The insulating elements further line the inner surfaces of their respective coupling flanges and abut one another at 22. Recesses 24a and 24b are provided in the respective insulating elements for respectively receiving Belleville spring assemblies 26a and 26b to be more fully described below.

There are disposed within the hollow shaft members one or more conductors. In FIG. 1, one conductor in each shaft member is shown for illustrative purposes and the conductors are referenced as 28a and 28b respectively. The conductors respectively include conductor flanges 30a and 30b. The conductor flanges formed at the extremity of each conductor are respectively disposed in the coupling flanges and electrically insulated therefrom as are the conductors 28a and 28b electrically insulated from their surrounding shafts 10a and 10b.

Although the shaft members 10a and 10b are rigidly held together by the bolts 18, it is also necessary to secure the conductor flanges 30a and 30b together to insure their electrical connection.

The Belleville spring assemblies 26a and 26b insure the electrical connection of the conductor flanges 30a and 30b. Each spring assembly as mounted in the recesses 24a and 24b includes a pair of pressure plates 32 with a plurality of Belleville springs mounted therebetween. In each assembly, one pressure plate reacts through the electrical insulating element against the coupling flange while the other pressure plate abuts and reacts against the conductor flange. Therefore, with the coupling flanges in a coupled condition, the spring assemblies urge the conductor flanges into electrical connection while preserving the electrical insulation of the latter members from the coupling flanges.

Figure 2:
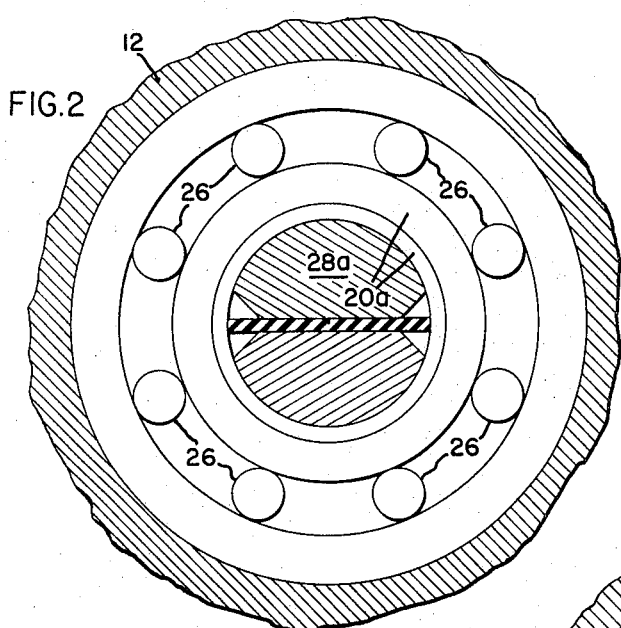
FIG. 2 is a cross-sectional view as indicated in FIG. 1 of the cavity in which the Belleville springs are mounted.

FIG. 2 illustrates a typical arrangement of a plurality of Bellevilles disposed about recess 24 in insulation 20 as viewed in cross section in FIG. 1. It is to be appreciated that the Belleville springs as mounted between the pressure plates 32 may be placed in the recess 24 in insulation 20 as an integral unit. It is only necessary then to bolt the coupling flanges of the hollow shaft members together to concurrently effect the electrical connection of conductors 10a and 10b thereby providing a simplified assembly procedure.

Figure 3:
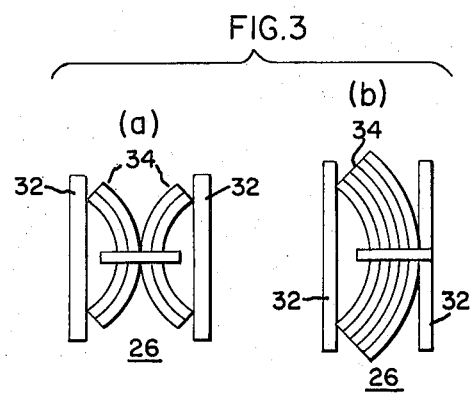
FIG. 3 depicts alternative ways in which a plurality of Belleville springs can be combined for utilization in the present invention.

FIG. 3 depicts alternative structures by means of which individual Belleville springs 34 may be mounted between the parallel pressure plates 32. FIG. 3a shows a plurality of Belleville springs in a series relationship and FIG. 3b shows a plurality of Belleville springs in a parallel relationship. By utilization of the foregoing structures, the spring constants and spring travel of the assembly 26 can be varied within the overall design of the coupling as would be apparent to those skilled in the art.

Figure 4:
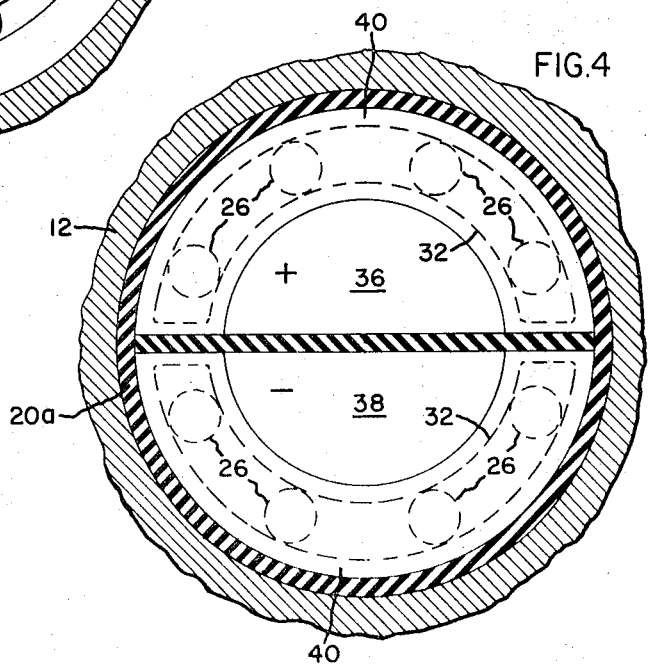
FIG. 4 is a cross-sectional view, as indicated in FIG. 1, of multiple conductor bars in one shaft member wherein each conductor bar is semicircular in cross section and insulated one from the other.

FIG. 4 depicts a cross section of a hollow shaft member which includes two semicircular conductor elements 36 and 38, insulated from one another, and which for illustrative purposes are shown as positive and negative. Each conductor element is also insulated from the surrounding hollow shaft and includes a substantially semicircular conductor flange 40. Each conductor flange is acted upon by a plurality of Belleville springs which are mounted between a pair of pressure plates 32 of semicircular dimension corresponding to the conductor flanges 40. The Belleville spring assemblies 26 in FIG. 4 would be mounted in the coupling flange 12 of each hollow shaft member as shown in FIG. 1 in cross section. The FIG. 4 arrangement is adapted for two semicircular conductor elements. The invention is also applicable to coaxial or concentric conductor elements and modification is within the scope of those skilled in the art.

In consideration of the prior art structures and assembly difficulties, the present invention greatly simplifies assembly of the coupling by eliminating the access holes necessary to effect the mechanical coupling of the conductor flanges which in turn also eliminates the problem of possible hydrogen leakage through such access holes when the coupling is utilized in the generator environment as had been encountered in the prior art.

While there is shown the preferred embodiment of the invention herein, it is, of course, understood that various modifications may be made and it is intended to cover in the appended claims, all such modifications as fall within the true spirit and scope of the invention.

What is claimed as new and desired to be secured by letters Patent of the United States is:

1. An electromechanical coupling comprising:
a pair of hollow shaft members, each said hollow shaft member defining an axial bore and each said hollow shaft member including a coupling flange proximate an end thereof;
at least one conductor axially disposed through said bore of each respective hollow shaft member, each said conductor including a conductor flange extending radially therefrom, said conductor flange being disposed in said coupling flange, and said conductor and conductor flange being electrically insulated from said hollow shaft member;

shaft coupling means for securing said coupling flanges together;

said conductor flanges being adjacently aligned when said coupling flanges are coupled together; and spring means insulatively disposed between at least one said conductor flange and its respective coupling flange to urge said conductor flanges into electrical connection.

2. The electromechanical coupling according to claim 1 wherein said spring means includes at least one Belleville spring.

3. The electromechanical coupling according to claim 2 wherein said spring means includes at least one pressure mounting plate, said Belleville spring being mounted to said pressure mounting plate.

4. The electromechanical coupling according to claim 1 wherein said spring means includes a plurality of Belleville springs disposed in a series relationship.

5. The electromechanical coupling according to claim 1 wherein said spring means includes a plurality of Belleville springs disposed in a parallel relationship.

* * * * *